US012806689B2

(12) United States Patent
Franck

(10) Patent No.: US 12,806,689 B2
(45) Date of Patent: Nov. 24, 2026

(54) METHOD AND APPARATUS FOR THE ADDITIVE MANUFACTURING OF A WORKPIECE

(71) Applicant: Jan Franck, Weidenberg (DE)

(72) Inventor: Jan Franck, Weidenberg (DE)

( * ) Notice: Subject to any disclaimer, the term of this patent is extended or adjusted under 35 U.S.C. 154(b) by 648 days.

(21) Appl. No.: 17/924,563

(22) PCT Filed: May 12, 2021

(86) PCT No.: PCT/IB2021/054034
§ 371 (c)(1),
(2) Date: Nov. 10, 2022

(87) PCT Pub. No.: WO2021/229457
PCT Pub. Date: Nov. 18, 2021

(65) Prior Publication Data

US 2023/0226608 A1 Jul. 20, 2023

(30) Foreign Application Priority Data

May 14, 2020 (DE) ..................... 10 2020 002 891.8

(51) Int. Cl.
*B22F 10/14* (2021.01)
*B22F 1/102* (2022.01)
*B22F 10/16* (2021.01)
*B22F 12/41* (2021.01)
(Continued)

(52) U.S. Cl.
CPC .............. *B22F 10/14* (2021.01); *B22F 1/102* (2022.01); *B22F 10/16* (2021.01); *B22F 12/41* (2021.01); *B33Y 10/00* (2014.12); *B33Y 70/10* (2020.01)

(58) Field of Classification Search
CPC .......... B22F 10/14; B22F 1/102; B22F 10/16; B22F 12/41; B33Y 10/00; B33Y 70/10; B33Y 30/00; B29C 64/264; B29C 64/165; Y02P 10/25
See application file for complete search history.

(56) References Cited

U.S. PATENT DOCUMENTS 5,749,041 A 5/1998 Lakshminarayan et al.
6,401,002 B1 * 6/2002 Jang ...................... B33Y 30/00 204/192.15
2017/0194539 A1 * 7/2017 Henning ................ B32B 27/08
(Continued)

FOREIGN PATENT DOCUMENTS

DE 102017207210 10/2018

OTHER PUBLICATIONS

3M, Bonding and Assembly, PUR Adhesives, https://www.3m.com/3M/en_US/bonding-and-assembly-us/structural-adhesives/pur-adhesives/, available Mar. 31, 2019, last accessed Oct. 29, 2025 (Year: 2019).*

*Primary Examiner* — Rebecca Janssen
(74) *Attorney, Agent, or Firm* — Pandiscio & Pandiscio

(57) ABSTRACT

A method and an apparatus for building up a workpiece layer by layer in the course of an additive manufacturing process, in particular in the form of a powder-bed process, wherein grains of a powder are fused to one another by using a binder, wherein the binder used is a heat-curable adhesive, which is not applied selectively, but layer by layer, and which is activated and cured by a controlled energy source, in particular a laser with a controlled laser beam, and thereby fuses respectively adjacent grains of the powder.

13 Claims, 1 Drawing Sheet

(51) Int. Cl.
*B33Y 10/00* (2015.01)
*B33Y 70/10* (2020.01)

(56) References Cited

U.S. PATENT DOCUMENTS

2018/0304560 A1* 10/2018 Eichenhofer .... G05B 19/41865
2020/0101534 A1 4/2020 Gibson
2020/0198006 A1* 6/2020 Fischer .................. B22F 10/16
2022/0314329 A1* 10/2022 Bromberg .............. B22F 12/70

* cited by examiner

METHOD AND APPARATUS FOR THE ADDITIVE MANUFACTURING OF A WORKPIECE

REFERENCE TO PENDING PRIOR PATENT APPLICATIONS

This patent application is a 371 national stage entry of pending prior International (PCT) Patent Application No. PCT/IB2021/054034, filed 12 May 2021 by Jan Franck for METHOD AND APPARATUS FOR THE ADDITIVE MANUFACTURING OF A WORKPIECE, which patent application, in turn, claims benefit of German Patent Application No. DE 10 2020 002 891.8, filed 14 May 2020.

The two (2) above-identified patent applications are hereby incorporated herein by reference.

FIELD OF THE INVENTION

The invention is directed to a method and an apparatus for building up a workpiece layer by layer in the course of an additive manufacturing process, in particular in the form of a powder-bed process, wherein grains of a powder are fused to one another by using a binder.

BACKGROUND OF THE INVENTION

So-called binder jetting is known above all from the prior art as a 3D printing process, wherein an ink jet printer is used to print a binder on a layer of a powder or granulate. The disadvantage of this method is that the binder requires a certain curing time, so that the manufacturing speed is limited. This restricted manufacturing speed results, among other things, from the fact that the printed binder must normally be cured thermally so that the printed component has a certain treatment hardness, and can be removed from the powder bed and cleaned, and then be fired and/or sintered in a furnace.

On the other hand, so-called selective laser sintering is known, wherein particles of a powder are directly sintered from a preferably metallic material without the use of a binder. However, the disadvantage of this method is that the particles to be sintered must be thereby heated to roughly their melting point, which, in the case of metallic materials, is in the order of magnitude of 1,000° C. or above, so that a substantial amount of energy must be used by means of laser beams. This, in turn, requires the use of a powerful and therefore expensive laser, and the energy consumption is also relatively high, which must be viewed as unfavorable with respect to protecting the environment.

SUMMARY OF THE INVENTION

The disadvantages of the described prior art resulted in the problem that initiated the invention of further developing a generic method and a generic apparatus in such a way that a high manufacturing speed can be achieved with simultaneously low energy consumption.

It is possible to solve this this problem as a part of the generic method by using a binder that is a heat-curable adhesive, i.e., either an adhesive that can be cured under the influence of heat or an adhesive that can be melted under the influence of heat and that solidifies during subsequent cooling, whereby this heat-curable material is not applied selectively but layer by layer and, after the application of every layer, is selectively activated and cured or selectively melted and cured during cooling, and thereby fuses respectively adjacent grains of the powder.

On the one hand, the temperature required to fuse the particles in this case is considerably lower than the melting temperature or sintering temperature of metals so that energy can be conserved. On the other hand, the thermal curing can take place in a virtually instantaneous manner so that high manufacturing speeds can be achieved.

Therefore, the adhesive used is not applied selectively as in the prior art, but over a larger surface, i.e., without exception on the entire surface of the powder bed, and it is cured, in particular thermally cured, only selectively, i.e., in particular only there where the workpiece is supposed to subsequently be. The heat-curable adhesive can already be mixed with the powder, or the powder is impregnated or coated with the heat-curable adhesive. Therefore, the method according to the invention is not tied to the limited quality and printing speed of print heads. The adhesive can also be sprayed directly on the powder, which is applied in a dry manner or without binder, in the powder bed.

The energy input in/on the heat-curable adhesive or the hot-melt adhesive preferably takes place by means of waves, in particular by means of electromagnetic waves, for example by means of microwaves, UV radiation, light, polarized light, monochromatic light, or the like. Since the adhesive according to the invention cures as a result of a heat input, high-energy radiation is generally to be preferred here, for example infrared rays.

A first possibility for selectively heating regions of the subsequent workpiece consists in that the energy input in/on the heat-curable adhesive or the hot-melt adhesive takes place by means of one or more masks and/or apertures, which mask out the radiation in in question in undesired regions. This technique allows the use of an unfocused beam, for example from heat radiation or infrared rays, such as that that is emitted by a suitable source of radiation, for example an infrared lamp. The masks and/or apertures arranged between the source of radiation and the powder layer to be irradiated serve, for every layer, to selectively mask out a region of the uppermost powder layer, which does not belong to the workpiece. In the case of this method, a mask or aperture that must be individually fabricated is generally required for every layer.

The invention recommends using waves, in particular electromagnetic waves, in the form of directed radiation, so that the energy input can be directed in a targeted manner onto specific regions of the powder with the heat-curable adhesive or with the hot-melt adhesive. In the process, in particular a focused beam, preferably a beam focused and/or controlled for each layer, for example an x-ray or a gamma ray, can be aimed very precisely.

According to the invention, every layer can be activated and cured selectively by a laser with a controlled laser beam. A laser beam is focused to the greatest degree and thus is especially well suited for the method according to the invention. The following can be considered for the lasers: gas lasers such as carbon dioxide lasers, helium neon lasers, excimer lasers, metal vapor lasers, or liquid lasers such as dye lasers, but also solid-state lasers such as e.g., semiconductor lasers, lasers with doped glass or yttrium aluminum garnet lasers, NdYAG lasers, titanium:sapphire lasers, color center lasers or even lasers based on titanium, chromium or neodymium. In terms of geometry, rod lasers, slab lasers, fiber lasers, and disk lasers, among others, are suitable.

It has been proven to be favorable that the power of the laser is controlled, in particular limited, in such a way that the grains of the powder are neither melted nor starting to melt nor sintered. As a result, energy is conserved, on the one hand, and, on the other hand, the adhesive encounters a structurally stable substrate and is able to optimally adapt thereto.

The method according to the invention can be realized according to a first embodiment in that a hot or hot-melt adhesive is used as the adhesive that can be melted under the influence of heat and that solidifies during subsequent cooling, preferably a thermoplastic or a thermoplastic elastomer, since thermoplastic materials melt when heated above their melting temperature and can fuse adjacent powder particles to one another during subsequent cooling, without those particles being melted or sintered.

Such a hot or hot-melt adhesive can be selected from the group consisting of polyamides (PA), polyethylene (PE), amorphous polyalphaolefines (APAO), ethylene vinyl acetate copolymers (EVAC), polyester elastomers (TPE-E), polyurethane elastomers (TPE-U), copolyamide elastomers (TPE-A), and vinyl pyrrolidone/vinyl acetate copolymers as well as mixtures thereof.

On the other hand, a reactive hot-melt adhesive can be also be used as the heat-curable adhesive, in particular a reactive hot-melt adhesive selected from the group consisting of polyurethane (PUR), epoxy and polysiloxanes (SI) as well as mixtures thereof. Reactive hot-melt adhesives in particular are in a position to change their chemical structure through a thermally triggered, chemical reaction, in particular by a (more extensive) crosslinking of their polymer structure, with the formation of a material with an increased melting point. These types of hot-melt adhesives include primarily thermosetting plastics.

The invention recommends that a powder of particles be used, which is coated with the heat-curable adhesive. In such cases, the procedure of imprinting a binder can be eliminated. Another approach would be to use a binder in granulate form and mix that with the grains of the powder. On the other hand, the advantage of using grains of a powder having a coating of a heat-curable adhesive, however, is that non-activated and therefore uncured powder-binder amounts can be removed when demolding a finished workpiece and be reused.

Another possibility of how the binder can get finely distributed in the powder consists of admixing particulate matter from the binder, in particular said heat-curable adhesive, with the powder. This particulate matter should be adequately finely ground or sieved, by comparison with a comparable degree of grinding or sieving as the powder itself.

Another possibility of introducing the binder in the uppermost powder layer is, after the powder layer as been applied, to spray binder in liquid form on this powder layer. In particular uncured or still reactive heat-curable thermoset resins can be dissolved in a suitable solvent or be finely distributed as an emulsion or suspension. Even cold thermoplastic particles can be applied as a suspension in this manner.

The grains can be a powder of an organic material, or a powder of an inorganic material, in particular of metal. The powder to be used can be selected, on the one hand, in accordance with the requirements of the finished product, as well as, on the other hand, be optimally combined with the properties of the binder.

However, the invention recommends the use of a powder with particles of an inorganic material or of metal, wherein the particles are coated with an organic binder. This approach is therefore generally advantageous, because the melting temperature or sintering temperature of inorganic materials such as metal, ceramic, etc. is for the most part considerably higher than the melting point or softening point of an organic material, or the reaction temperature of a reactive resin, so that, when the binder recommended according to the invention is hardening, the actual powder remains in a solid physical state and, when the adhesive is curing, can be wetted intensively on the surface by this, or remains as particles in the adhesive matrix.

Finally, beyond this, it is also conceivable to subsequently refine a workpiece manufactured in this manner, for example by an generalized heating or by a coating and/or a surface treatment, etc.

An additive manufacturing process for building up a workpiece layer by layer, in particular in the form of a powder-bed process, wherein grains of a powder are fused to one another by using a binder, is characterized by a controllable thermal energy source, whereby a full-area, i.e., non-selectively applied binder, in particular an adhesive that can be cured under the influence of heat or an adhesive that can be melted under the influence of heat and that solidifies during subsequent cooling, is activated and cured layer by layer in selected regions, wherein respectively adjacent grains of the powder are fused.

As a result, the application of the binder is not selective, rather only the thermal curing thereof. In general, less energy is required for this type of local or selective energy input than for a global or non-selective energy input. Since, on the other hand, only the binder, which is generally organic, must be heated to its hardening temperature and not the preferably inorganic powder itself to its melting temperature or sintering temperature, a considerably lower temperature level is required overall, so that a substantial amount of energy can be conserved with this type of manufacturing technology.

A manufacturing process according to the invention is characterized as part of a first embodiment by a light source for light or infrared rays, whose rays of light are selectively controlled by means of a mask or aperture on selected regions of the uppermost powder layer. Since undesired regions of the powder bed are hereby blocked by the mask or aperture, a focusing of the light or the infrared rays is not required; complex or even controllable optics are not required as a result.

However, in general different masks or apertures must be also be used for different powder layers. Therefore, in this case, the invention recommends a device to change the mask with the selected regions of the respective uppermost layer of the workpiece semi-finished product when building up individual, multiple or all layers. If this is possible under thermal aspects, different apertures or masks could be arranged e.g., on an otherwise transparent film, which is then wound further each time by the length of a mask or aperture for every new layer of the workpiece semi-finished product or every layer of the workpiece semi-finished product to be formed with a different geometry. To keep the masked-out regions of these mask templates or aperture templates from getting excessively heated, for example a material reflecting thermal radiation could be used for this such as a metallic layer, e.g., of silver, or a suitable material based on a nano-thermochromic coating, e.g., a coating of nano-silver.

Another possibility of realizing the invention is provided by lasers with a controllable laser beam, whereby a heat-curable adhesive is activated and cured layer by layer by the laser beam, wherein respectively adjacent grains of the powder are fused.

In the process, a laser according to the invention is a preferred means to activate the heat-curable material in the shortest time and cause it to harden. Since, on the other hand, the temperature that is required for just that activation is much lower than the smelting temperature or sintering temperature of metals, this type of laser requires a considerably lower amount of energy than in the case of selective laser sintering. Since in this case the power of the laser can be controlled, in particular limited, in such a way that the grains of the powder are neither melted nor starting to melt nor sintered.

It is within the scope of the invention that the laser beam can be controlled by means of optics, in particular by means of mirrors, in order to point those mirrors to just those locations where the workpiece being manufactured is supposed to be built up.

Furthermore, it corresponds to the teaching of the invention that the laser beam is controlled by a program in such a way that it selectively heats only the grains of the powder that are to be fused. It can thus be pulsed for example, so that only energy is emitted in respectively one moment, when the mirrors have aimed the laser beam at a point at which the workpiece is being built up.

An additive manufacturing process preferably comprises a device for the layer by layer application of powder. In the process, a differentiation must be made between the actual application step and, if applicable, a subsequent leveling step, if a uniform layer thickness is not guaranteed in the case of the selected application technology.

For example, the powder can be strewn in an approximately uniform layer thickness on a base plate or on the already existing, but still unfinished workpiece semi-finished product that is embedded in uncured powder. However, it depends on the quality of the strewing mechanism used whether a uniform layer thickness is thereby ensured or a subsequent smoothing or leveling is required.

In the case of other methods for applying the powder, the application step can be combined with a leveling step. This applies in particular if the device for the layer by layer application of powder has a scraper or a roller in order to level off the uppermost last applied powder layer, in particular if the scraper can be pulled off in a level manner on lateral rails or the like or the roller is positioned in a framework. Other devices are also possibly conceivable as long as they are suitable for applying a new thin layer of the powder with a thickness of, for example, one or several μm on a layer that has already been cured in advance in regions.

The additive manufacturing process according to the invention can be supplemented by a heating device to preheat the grains of the powder, whereby the energy to be introduced by the laser can be further reduced.

Finally, an additive manufacturing process according to the present invention, can comprise a device for coating the grains of the powder with the binder, if these types of coated grains are not commercially available.

If the manufacturing process according to the invention has a device for spraying on a liquid or liquefied binder on the uppermost layer of the powder, then the process step, wherein the particles of the powder are coated or covered with the binder, as well as the mixing of the powder with finely ground or sieved binder particles can thus be eliminated. Instead the entire uppermost powder that was applied and possibly smoothed or leveled off already on the base plate or on the already existing, but still unfinished workpiece semi-finished product is sprayed with the binder or the thermally curing adhesive. The uppermost powder layer impregnated with the binder is still cured selectively in a subsequent step of the process. As already described above, the energy input in this case can be accomplished with all conceivable rays, which are either partially masked-out or which are controllable and can be focused as sharply as possible, for example with rays of light, UV radiation, gamma rays, etc.

The one device for spraying on a liquid or liquefied binder should have a nozzle, preferably an atomizing spray nozzle, which sprays the liquid or liquefied binder diffusely on the uppermost layer of the powder. If the base area of the base plate is relatively large for a single nozzle, several nozzles can be used either next to each other or in a grid, or one nozzle, which can be moved for example by means of a guide carriage or a cross carriage in a horizontal direction or in two horizontal directions that are at a right angle to each other above the base plate or the still unfinished workpiece semi-finished product.

While a single nozzle could be arranged directly on the underside of a container for the liquid or liquefied binder, it can be advantageous, especially when using several nozzles or a movable nozzle, to connect the nozzle(s) via a hose to the container for the liquid or liquefied binder.

The invention is also characterized by a device for coating the grains of the powder with the binder, in particular before the use of the powder in the powder-bed process according to the invention. Suitable systems for this are pan-coating drums, fluidized-bed reactors and spouted-bed reactors, wherein, in the latter two systems, a gas flows from the bottom through a powder and fluidizes it.

In the case of a spouted-bed reactor, the gas input can be designed to be non-homogeneous as compared to a fluidized-bed reactor, so that in the center a beam that is still directed upwards within the powder bed is yielded, where the velocity of the gas is higher than the minimum fluidization velocity, while in a fluidized-bed reactor, the gas velocity is lower, typically only about as great as the minimum fluidization velocity, but relatively homogenous, from which a fluidization also results.

In the fluidized bed or spouted bed, the binder is then sprayed in a liquid state and dries or solidifies on the surface of the powder grains.

In the case of the so-called melt-coating method or hot-melt coating, the binder that is solid at room temperature is heated above its melting point and is sprayed in the likewise hot gas stream. In contrast to the gas stream, the temperature of the grains of powder is below the melting temperature of the binder, so that the binder gets deposited on the cooler powder grains and forms a coating there. This method is suitable above all for the coating of grains of powder with a thermoplastic or a thermoplastic elastomer.

In the case of the standard spray-coating method or simply spray coating, the binder, on the other hand, is liquefied by a solvent, which evaporates in the hot gas stream, so that the binder get deposited on the surface of the grains of powder. This method is also suitable for coating the grains of powder with an uncured or still reactive, heat-curable thermoset resin, as long as the process temperature is below the reaction temperature of the thermoset resin, at which it hardens.

BRIEF DESCRIPTION OF THE DRAWINGS

Additional features, properties, advantages, and effects based on the invention are yielded from the following description of preferred embodiments of the invention as well as based on the drawing, which shows.

DETAILED DESCRIPTION OF THE PREFERRED EMBODIMENTS

Figure 1:
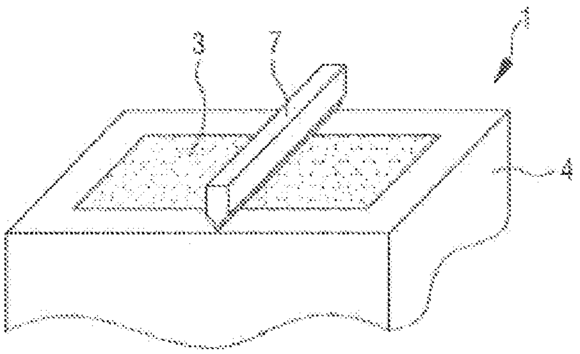
FIG. 1A first step of an additive manufacturing process according to the invention for building up a workpiece layer by layer, wherein an additional layer of a powder is applied to a bed.

The drawing depicts a preferred apparatus 1 for building up a workpiece 2 layer by layer from a powder 3 using additive manufacturing.

One can see a horizontal frame 4, inside of which a base plate 5 is arranged so that it is can be displaced vertically, for example by means of a very finely adjustable lifting cylinder or a preferably electrically operated motor such as a stepper motor or a position-controlled electric motor.

As FIG. 1 shows, to produce a single layer of the workpiece 2 on the base plate 5 or on a semi-finished product 6, which was already previously begun on this base plate 5 and which is still embedded in powder 3, a layer of powder 4 is applied and distributed in such a way that the most recent layer is as level as possible. This can be accomplished for example by means of a scraper 7, which is drawn over the previously strewn powder layer, in order to level it off, or by a roller that is rolled over the previously strewn powder layer. The powder layer itself can be strewn or sprayed on or applied with another technique.

Figure 2:
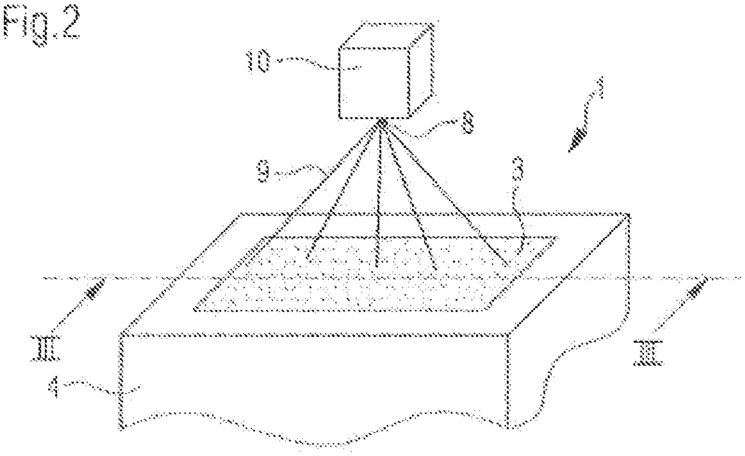
FIG. 2A second step of the method from FIG. 1, wherein a binder is sprayed onto the last applied layer of powder; as well as FIG. 3A third step of the same method, wherein specific regions of the last applied and sprayed-on powder layer are cured or solidified by selective temperature effects.
Figure 3:
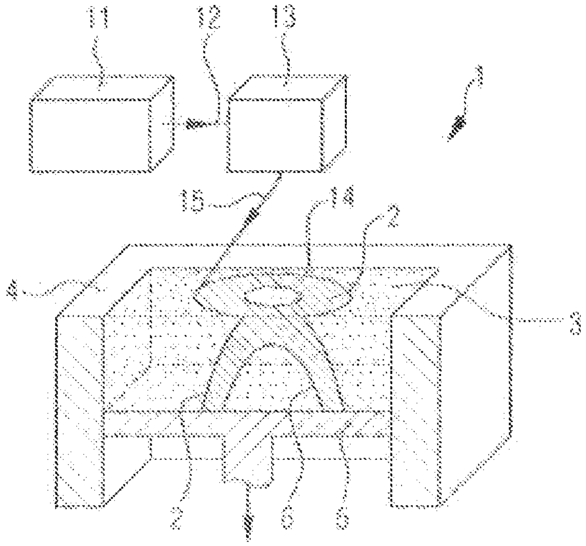

In a second process step, which is reflected in FIG. 2, a liquid or liquefied binder is sprayed or sputtered on the uppermost powder layer. An atomizing spray nozzle 8 that is used in the process is supposed to ensure that the binder 9 gets sprayed or sputtered as uniformly as possible on the entire the powder layer 3. To this end, the atomizing spray nozzle 8 can be arranged optionally above the base plate 5 or even be horizontally movable, in order to be able to approach different positions above the base plate 5. The atomizing spray nozzle 8 can be arranged either directly beneath a container 10 with the liquid or liquefied binder 9, or be separated therefrom and be connected via hose to the container 10.

If a powder 3 is used, with which the individual particles are either coated with a binder, or with which binder particles are admixed, it is possible to dispense with said second step.

While the first two steps of the process were not selective, but are only meant to contribute to the most homogenous possible distribution of the powder and of the binder, the actual shaping now follows in a third step of the process.

In this case, a thermal energy source is controlled in such a way that the binder 9 or the adhesive is thermally activated selectively in the uppermost, last applied powder layer and cured, so that at the location of the subsequent workpiece 3 respectively adjacent grains of the powder 3 are fused to one another, and namely within the uppermost layer as well as also to an earlier already applied layer that might be beneath it.

In the case of the depicted embodiment, the energy source is a laser 11, whose laser beam 12 can be directed via controllable optics 13 onto different, selected regions 14 in the uppermost layer of the powder 3, which the deflected laser beam 15 is able recognize.

As a part of the method according to the invention, the laser can be pulsed so that the optics 13 stop initially always at an almost punctiform region to be cured, and the laser 11 is then briefly pulsed in order to introduce a defined quantity of heat in the punctiform region in question, and then stops at a next almost punctiform region to be cured, etc.

On the other hand, in the case of contiguous surfaces, the laser 11 can also be operated continuously and the laser beam 12, 15 can be adjusted by means of the optics 13 with a defined speed, which is selected so that a defined quantity of heat per unit of area is in turn introduced in the uppermost powder layer 3.

The energy of the laser 11 is transferred in split seconds in a sufficient quantity onto the respectively selected surface area and produces immediate curing or melting of the local binder 9, which thereby becomes solid either immediately or after a short cooling phase. Therefore, after adjusting the height of the base plate 5 bearing the workpiece semi-finished product 6, it is possible to immediately apply a subsequent powder layer 3, so as to repeat all of the foregoing processing steps layer by layer until the finished workpiece 2 has been created layer by layer from the semi-finished product 6.

This can then be removed from the powder bed 3, if applicable, after previously removing the uncured regions of the powder bed 3.

After that the workpiece can be refined more, either by being cured further by a repeated thermal treatment until all binder portions contained are cured, or it could undergo a surface treatment, for example by polishing or the like.

LIST OF REFERENCE NUMBERS

1 Apparatus
2 Workpiece
3 Powder
4 Frame
5 Base plate
6 Semi-finished product
7 Scraper
8 Atomizing spray nozzle
9 Binder
10 Container
11 Laser
12 Laser beam
13 Optics
14 Selected region
15 Laser beam

The invention claimed is:

1. An additive manufacturing process for building up an end product (2) layer by layer, in the form of a powder-bed process, wherein grains of a powder (3) are fused to one another by using a binder (9), wherein the binder (9) used is an adhesive that can be cured under the influence of heat, wherein the adhesive is a reactive heat curable thermoset adhesive, which is not applied selectively but layer by layer and, after the application of every layer, is selectively activated and cured, and thereby fuses respectively adjacent grains of the powder (3), wherein the reactive heat curable thermoset adhesive is dissolved in a suitable solvent or finely distributed as an emulsion or suspension and is sprayed in liquid form onto the powder layer (3), and wherein the energy input in/on the reactive heat-curable thermoset adhesive takes place by means of one or more masks and/or apertures, whereby, through the masks and/or apertures for each layer, a region of the uppermost powder layer is selectively masked out.

2. The additive manufacturing process according to claim 1, characterized in that the energy input in/on the reactive heat-curable adhesive takes place by means of an unfocused beam.

3. The additive manufacturing process according to claim 1, characterized in that the energy input in/on the reactive heat-curable adhesive takes place by means of at least one from the group consisting of electromagnetic waves, microwaves, UV radiation, light, polarized light and monochromatic light.

4. The additive manufacturing process according to claim 3, characterized in that the energy input in/on the reactive heat-curable adhesive takes place by means of at least one laser (11).

5. The additive manufacturing process according to claim 4, characterized in that the introduced thermal energy or the power of the laser (11) is controlled, in particular limited, in such a way that the grains of the powder (3) are neither melted nor starting to melt nor sintered.

6. The additive manufacturing process according to claim 1, characterized in that the reactive heat-curable adhesive is selected from the group consisting of polyurethane (PUR), epoxy and polysiloxanes (SI) as well as mixtures thereof.

7. The additive manufacturing process according to claim 1, characterized in that a powder (3) of an organic material is used.

8. The additive manufacturing process according to claim 1, characterized in that a powder (3) of an inorganic material is used.

9. The additive manufacturing process according to claim 8, characterized in that a powder (3) with particles of a metal is used.

10. The additive manufacturing process according to claim 1, characterized in that the uncured or still reactive heat curable thermoset adhesive is sprayed in atomized form onto the powder layer (3).

11. The additive manufacturing process according to claim 1, characterized in that the reactive heat curable thermoset adhesive is selected from polysiloxanes (SI).

12. An additive manufacturing process for building up an end product (2) layer by layer, in the form of a powder-bed process, wherein grains of a powder (3) are fused to one another by using a binder (9), wherein the binder (9) used is an adhesive that can be cured under the influence of heat, wherein the adhesive is a reactive heat curable adhesive, which is not applied selectively but layer by layer and, after the application of every layer, is selectively activated and cured, and thereby fuses respectively adjacent grains of the powder (3), wherein the uncured or still reactive heat curable adhesive is dissolved in a suitable solvent or finely distributed as an emulsion or suspension and is sprayed in liquid form onto the powder layer (3), and wherein the energy input in/on the reactive heat-curable adhesive takes place by means of one or more masks and/or apertures, by means of an unfocused beam, whereby, through the masks and/or apertures for each layer, a region of the uppermost powder layer is selectively masked out, and wherein the heat-curable adhesive is selected from the group consisting of polyurethane (PUR), epoxy and polysiloxanes (SI) and mixtures thereof.

13. An additive manufacturing process for building up an end product (2) layer by layer, in the form of a powder-bed process, wherein grains of a powder (3) are fused to one another by using a binder (9), wherein the binder (9) used is an adhesive that can be cured under the influence of heat, wherein the adhesive is a reactive heat curable adhesive, which is not applied selectively but layer by layer and, after the application of every layer, is selectively activated and cured of, and thereby fuses respectively adjacent grains of the powder (3), wherein the uncured or still reactive heat curable adhesive is dissolved in a suitable solvent or finely distributed as an emulsion or suspension and is sprayed in liquid form onto the powder layer (3), and wherein the energy input in/on the reactive heat-curable adhesive takes place by means of one or more masks and/or apertures, by means of an unfocused beam, whereby, through the masks and/or apertures for each layer, a region of the uppermost powder layer is selectively masked out, and wherein the heat-curable adhesive is selected from the group consisting of polyurethane (PUR), polysiloxanes (SI) and mixtures thereof.

* * * * *